(12) United States Patent
Szigeti et al.

(10) Patent No.: US 12,519,834 B2
(45) Date of Patent: Jan. 6, 2026

(54) NETWORK API PATH TRACING

(71) Applicant: Cisco Technology, Inc., San Jose, CA (US)

(72) Inventors: Thomas Szigeti, Vancouver (CA); Hendrikus G.P. Bosch, Aalsmeer (NL); David John Zacks, Vancouver (CA); Walter Theodore Hulick, Jr., Pearland, TX (US); Nagendra Kumar Nainar, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 322 days.

(21) Appl. No.: 17/749,609

(22) Filed: May 20, 2022

(65) Prior Publication Data

US 2023/0379365 A1 Nov. 23, 2023

(51) Int. Cl.
*H04L 9/40* (2022.01)
*G06F 9/54* (2006.01)

(52) U.S. Cl.
CPC ............ *H04L 63/20* (2013.01); *G06F 9/547* (2013.01)

(58) Field of Classification Search
CPC ..... H04L 63/20; H04L 63/1425; G06F 9/547; G06F 9/5077; G06F 9/541
USPC .......................................................... 726/1
See application file for complete search history.

(56) References Cited

U.S. PATENT DOCUMENTS

| | | | |
|---|---|---|---|
| 8,893,009 B2 | 11/2014 | Raleigh et al. | |
| 11,150,963 B2 | 10/2021 | Nainar et al. | |
| 11,190,424 B2 | 11/2021 | Raut et al. | |
| 11,218,376 B2 | 1/2022 | Jain et al. | |
| 2007/0143851 A1* | 6/2007 | Nicodemus | G06F 11/3495 726/4 |
| 2019/0362067 A1* | 11/2019 | Salehpour | G06F 21/566 |
| 2021/0303366 A1 | 9/2021 | Anderson et al. | |
| 2022/0368699 A1* | 11/2022 | Thomson | H04L 63/104 |

OTHER PUBLICATIONS

BorderPatrol: Securing BYOD using Fine-Grained Contextual Information; Zungur et al., Jun. 2019 (Year: 2019).*
"Internet Outages Map", online: https://www.thousandeyes.com/outages/, accessed Apr. 28, 2022, 11 pages, ThousandEyes.
"Cloud Agents World Map", online: https://www.thousandeyes.com/product/cloud-agents, accessed Apr. 28, 2022, 11 pages, ThousandEyes.

(Continued)

*Primary Examiner* — Jahangir Kabir
(74) *Attorney, Agent, or Firm* — Lee & Hayes, P.C.

(57) ABSTRACT

In one embodiment, a device receives traffic flow information regarding an application programming interface call made to a particular endpoint via a path in a network. The device requests, based on the traffic flow information, that a plurality of distributed agents in the network perform a trace of the path taken by the application programming interface call. The device receives results from the trace of the path performed by the plurality of distributed agents. The device causes a security policy to be enforced with respect to application programming interface calls made to the particular endpoint, based on the results from the trace.

18 Claims, 10 Drawing Sheets

(56) References Cited

OTHER PUBLICATIONS

McNicholas, Ed, "Cisco Cloud Native Security—Part 1, Going Up the Stack from Infrastructure to Application", online: https://blogs.cisco.com/developer/cloudnativesecurity01, Mar. 1, 2022, accessed Apr. 29, 2022, 10 pages, Cisco Systems, Inc.
"Traceroute", online: https://en.wikipedia.org/wiki/Traceroute, Mar. 9, 2022, accessed Apr. 29, 2022, 5 pages, Wikimedia Foundation, Inc.
"ThousandEyes + Cisco SD-WAN—Taking SD-WAN Visibility from WAN Edge to the Internet", online: https://www.thousandeyes.com/solutions/cisco-sdwan, Mar. 4, 2022, accessed Apr. 29, 2022, 7 pages, Cisco Systems, Inc.
"Flexible NetFlow", online: https://www.cisco.com/c/en/us/products/ios-nx-os-software/flexible-netflow/index.html, accessed Apr. 29, 2022, 3 pages, Cisco Systems, Inc.
"What is a Container?—Docker", online: https://www.docker.com/resources/what-container/, accessed May 2, 2022, 9 pages, Docker Inc.
"What s Istio?", online: https://www.redhat.com/en/topics/microservices/what-is-istio, accessed May 4, 2022, 3 pages, Red Hat.
"Kubernetes", online: https://en.wikipedia.org/wiki/Kubernetes, accessed May 2, 2022, 11 pages, Wikimedia Foundation, Inc.
"OS-Level Virtualization", online: https://en.wikipedia.org/wiki/OS-level_virtualization, Apr. 21, 2022, accessed May 2, 2022, 4 pages, Wikimedia Foundation, Inc.

\* cited by examiner

NETWORK API PATH TRACING

TECHNICAL FIELD

The present disclosure relates generally to computer systems, and, more particularly, to tracing the network paths taken by application programming interface (API) calls.

BACKGROUND

Many organizations are increasingly adopting cloud-native architectures, as these enable rapid application development with flexibility, stability, portability, and scale. However, microservice-based architectures also massively increase the attack surface and expose applications to new vulnerabilities and threats. One such attack vector to such architectures is the exploitation of application programming interfaces (APIs) that microservices leverage to communicate with each other.

To limit the threat exposure presented by API calls, organizations sometimes enforce restrictions on the types of APIs that are allowed to be used. These restrictions may be based on security assessments of the APIs from various security utilities. One specific criterion for API selection may be the geographic location of the endpoint providing the API. For example, network operators may specify a compliance rule that only permits use of APIs hosted in a specific geographic region. However, even if an API is hosted in a region permitted by policy, the actual network path taken to reach the API provider may still traverse suspicious and/or undesired locations, thereby defeating the intent of the policy.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
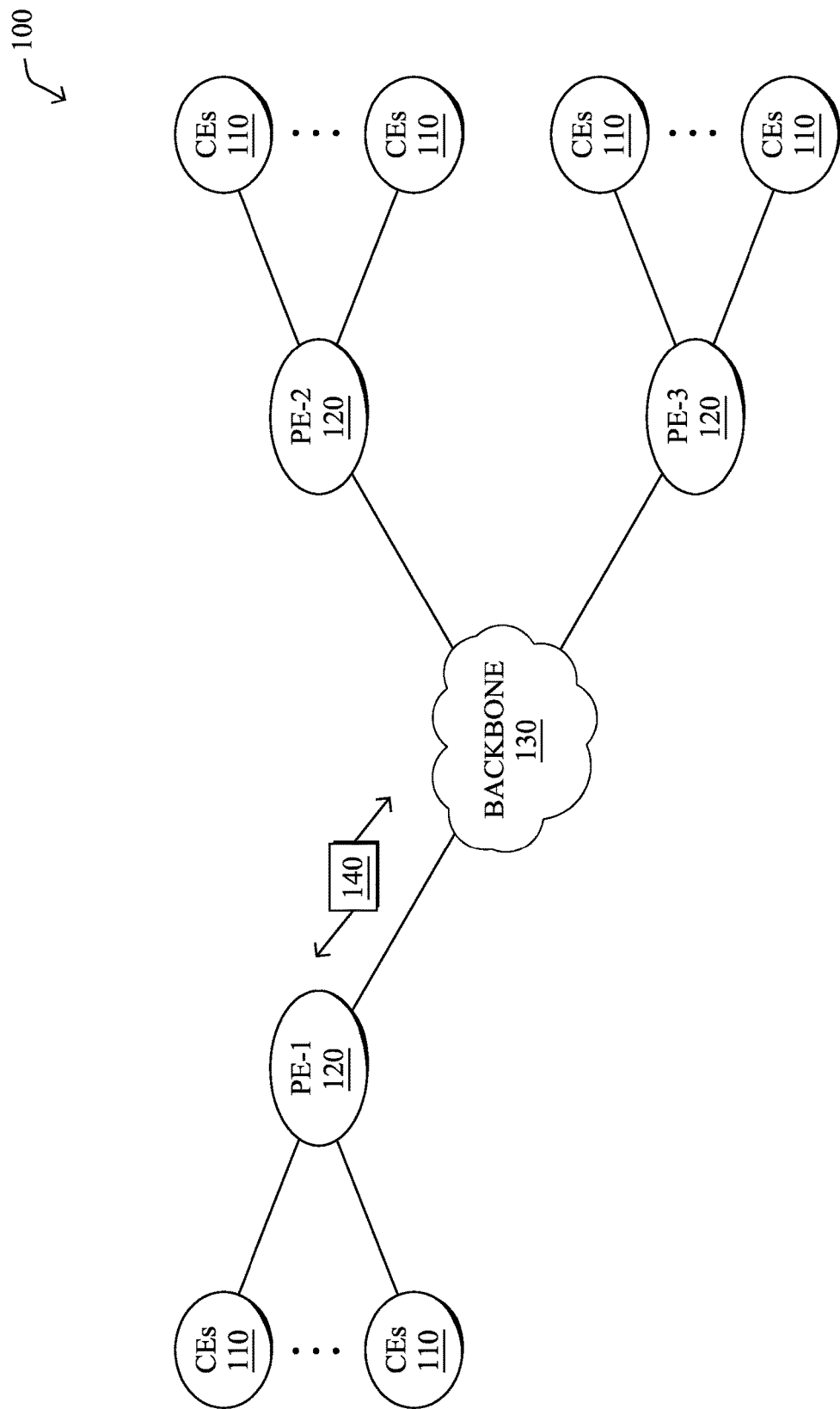
FIGS. 1A-1B illustrate an example computer network.

According to one or more embodiments of the disclosure, a device receives traffic flow information regarding an application programming interface call made to a particular endpoint via a path in a network. The device requests, based on the traffic flow information, that a plurality of distributed agents in the network perform a trace of the path taken by the application programming interface call. The device receives results from the trace of the path performed by the plurality of distributed agents. The device causes a security policy to be enforced with respect to application programming interface calls made to the particular endpoint, based on the results from the trace.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
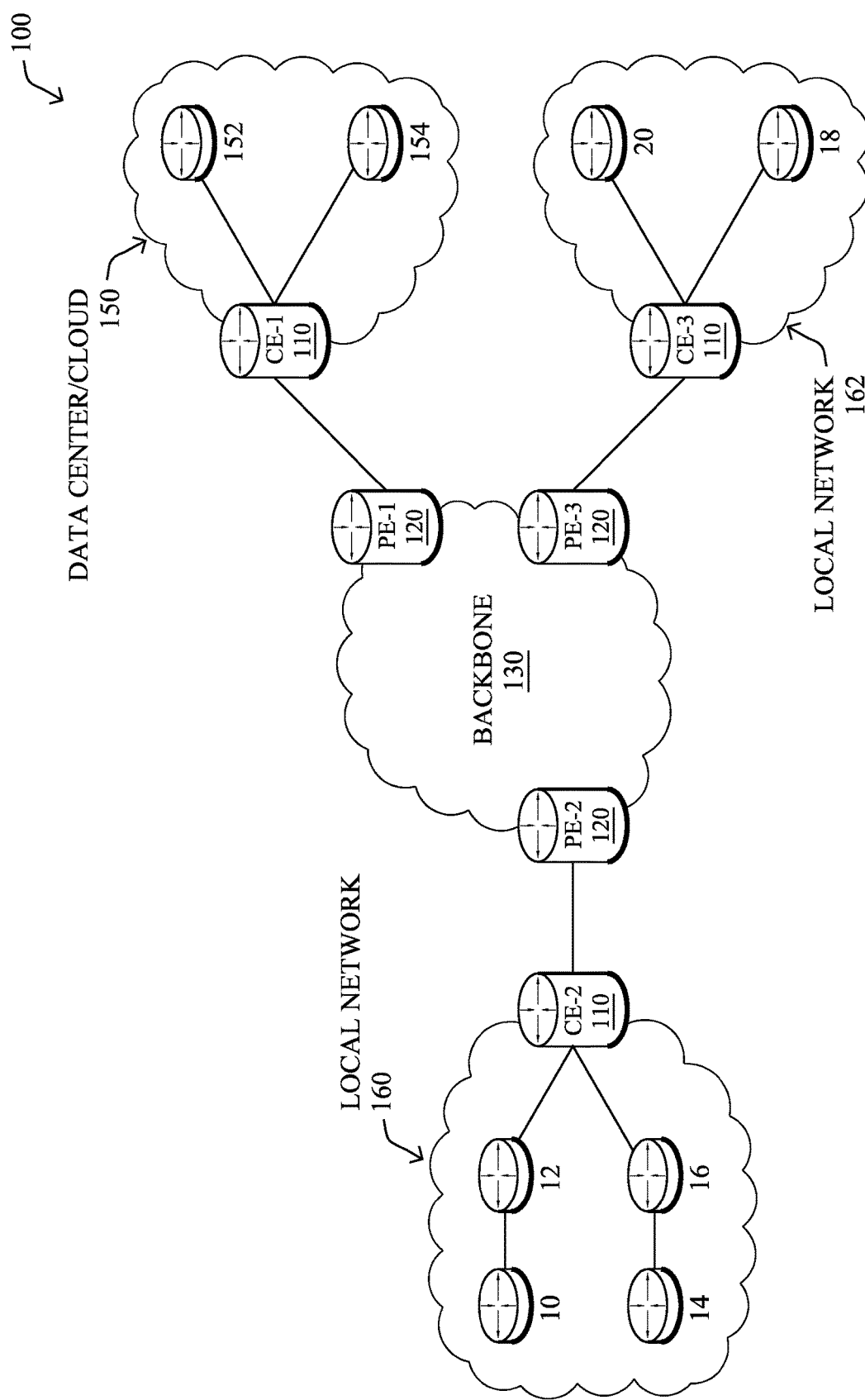

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
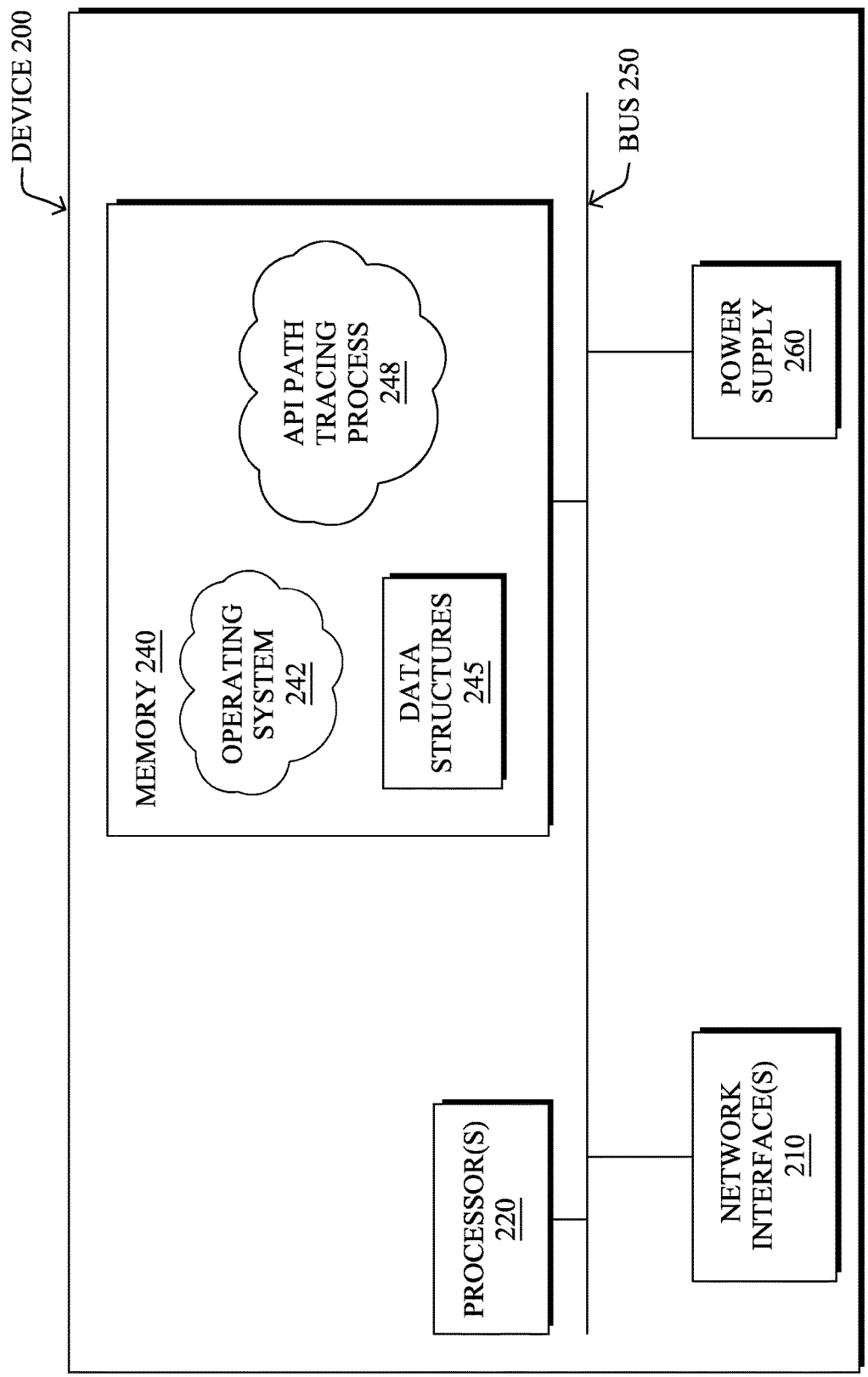
FIG. 2 illustrates an example computing device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application programming interface (API) path tracing process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Figure 3:
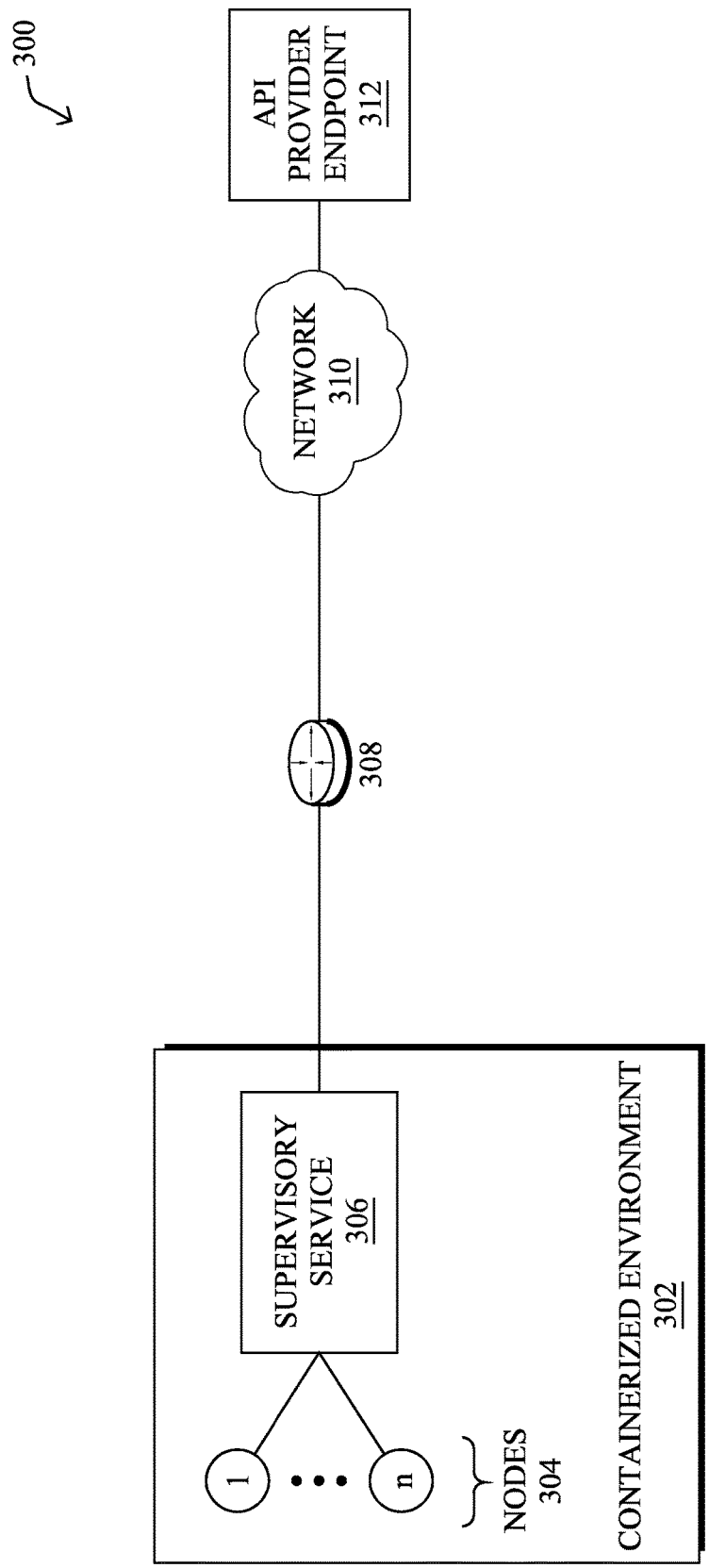
FIG. 3 illustrates an example architecture for making an application programming interface (API) call.

FIG. 3 illustrates an example architecture 300 for making an application programming interface (API) call, according to various embodiments. As shown, architecture 300 may include a containerized environment 302 in which a containerized application is executed, in some embodiments. Today, many cloud-hosted applications are executed in such environments, which allows different workloads of an application to be executed in software containers. As would be appreciated, software containers are a tool used to virtualize a computing environment, including the operating system, allowing different (micro-)services/workloads to be executed by the same node in an isolated manner. For instance, different (micro-)services/workloads of an application may be executed across n-number of nodes 304 within containerized environment 302.

Management of containerized environment 302 may be performed by any number of platforms that control different aspects of containerized environment 302. For instance, containerized environment 302 may be implemented using Kubernetes, which is an orchestration system for containerized applications and in charge of managing the cluster of nodes 304. Similarly, containerized environment 302 may also be implemented in part using Istio, which is a service mesh platform that controls how (micro-)services share data with one another. Often, Kubernetes and Istio are used together, to deploy an application in a cloud environment, in a containerized manner. Of course, in other embodiments, containerized environment 302 may be implemented using other utilities, as desired. In addition, while the techniques herein are described with respect to performing API tracing with respect to a containerized environment, the techniques herein are not limited as such and can be applied to any number of different types of entities that send API calls over a network.

There are various forms of API calls that may be made by a containerized application such as calls made to internal APIs (e.g., calls made between nodes 304), shadow APIs (e.g., undocumented APIs), zombie APIs (e.g., deprecated APIs), and external APIs (e.g., calls made outside of containerized environment 302). In various embodiments, a supervisory service 306 may operate in conjunction with containerized environment 302, to monitor any or all API communications associated with containerized environment 302. For instance, Secure Cloud Native (SCN) by Cisco Systems, Inc. is able to monitor all API communications at Layer 7 within a containerized environment. In addition, SCN is also aware of the Layer 3 IP addresses and Layer 4 ports of all API endpoints, allowing it to identify the IP flows associated with API calls by their 5-tuples.

With respect to external API calls, one or more networking devices, such as networking device 308, may provide connectivity to an external network 310, thereby allowing any of nodes 304 to make an API call to an external API provider endpoint 312. For instance, networking device 308 may take the form of a software-defined WAN (SD-WAN) router that provides connectivity to nodes 304 in containerized environment 302.

As noted above, a supervisory service for a containerized environment may apply security policies to API calls. For instance, supervisory service 306, having visibility into the API calls by nodes 304 and their corresponding network flows, may impose restrictions on where the calls may be made. Indeed, many security policies for API calls now monitor for calls made to network addresses located in restricted countries. When a violation is detected, the supervisory service can then take corrective measures such as blocking the flow, raising an alert, and the like.

To date, however, security policies regarding API calls have ignored the actual path taken by the traffic associated with the call, instead only focusing on the location of the target API provider endpoint. For instance, supervisory service 306 may capture traffic flow information (e.g., the 5-tuple) for an API call made by a node 304 to external API provider endpoint 312 and determine whether external API provider endpoint 312 is located in a prohibited location. However, there may still be situations in which external API provider endpoint 312 is located in an allowed location, but the path taken by the traffic traverses a prohibited location, defeating the intent of the policy in the first place.

Network API Path Tracing

The techniques herein introduce path tracing mechanisms for API calls that provide visibility into the paths taken by API calls through the use of distributed agents throughout a network. By capturing the path tracing details, the results of the trace can then be used for purposes of enforcing security polices, such as those that prohibit traffic for API calls to traverse certain locations (e.g., countries, continents, regions, etc.).

Illustratively, the techniques described herein may be performed by hardware, software, and/or firmware, such as in accordance with the illustrative API path tracing process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.).

Specifically, according to various embodiments, a device receives traffic flow information regarding an application programming interface call made to a particular endpoint via a path in a network. The device requests, based on the traffic flow information, that a plurality of distributed agents in the network perform a trace of the path taken by the application programming interface call. The device receives results from the trace of the path performed by the plurality of distributed agents. The device causes a security policy to be enforced with respect to application programming interface calls made to the particular endpoint, based on the results from the trace.

Figure 4A:
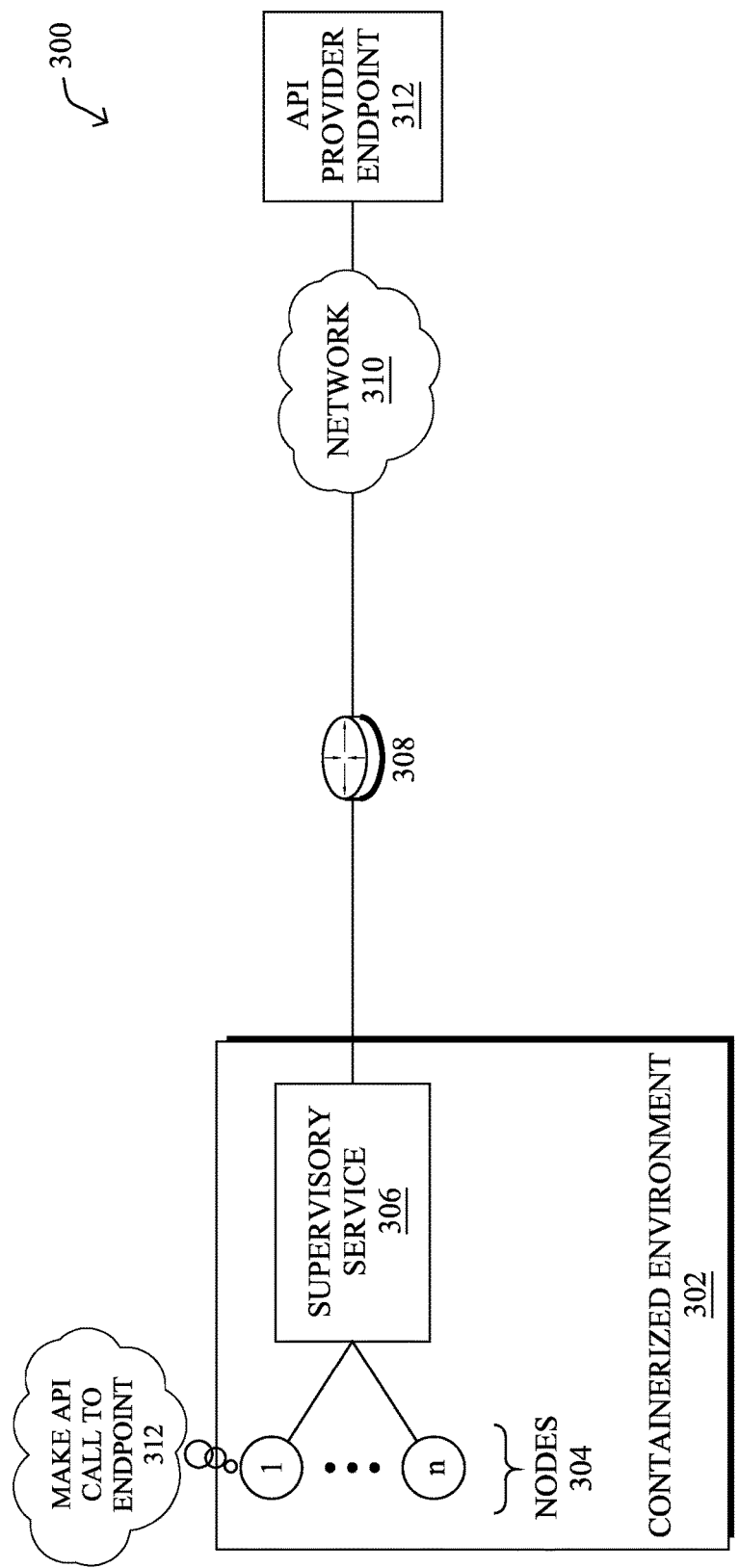
FIGS. 4A-4C illustrate an example of initiating API tracing in the architecture of FIG. 3.
Figure 4B:
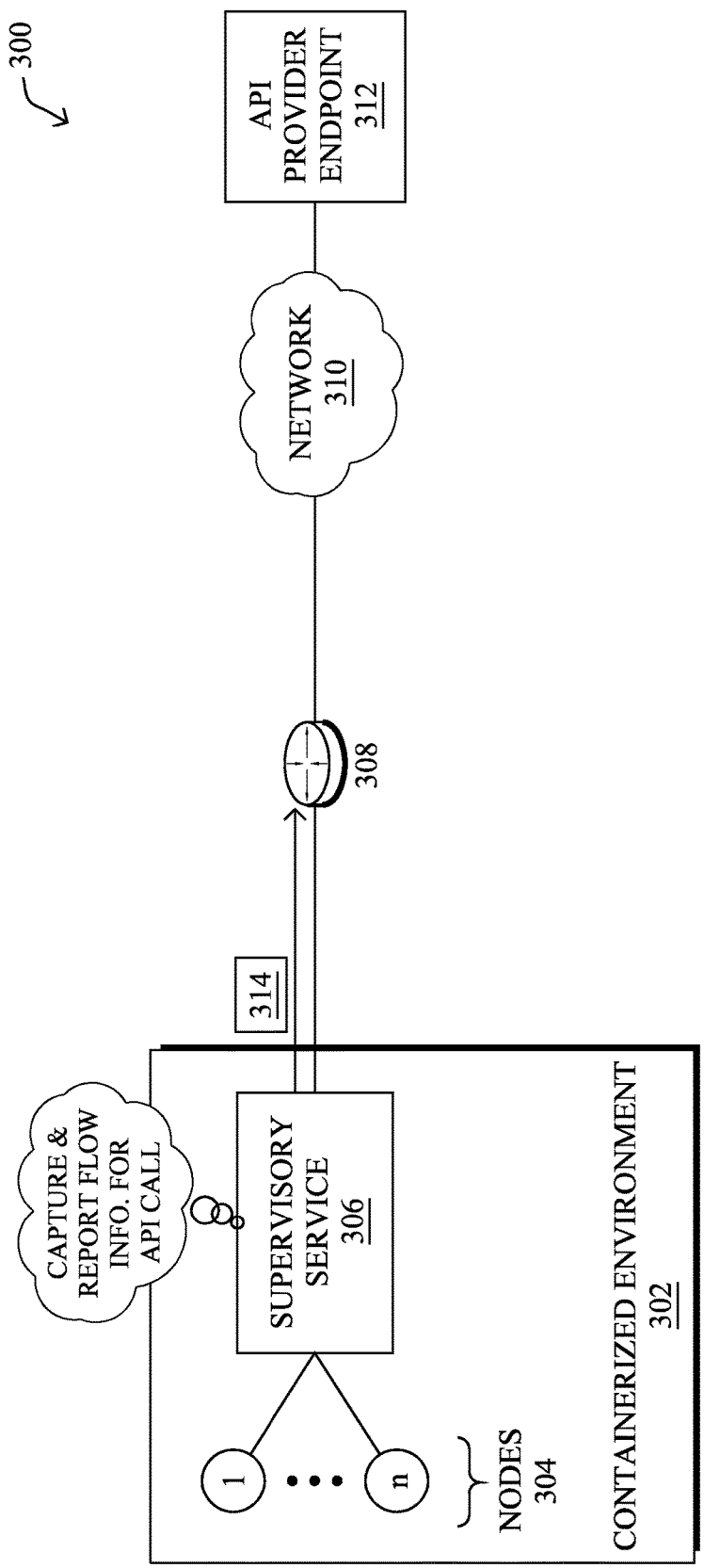
Figure 4C:
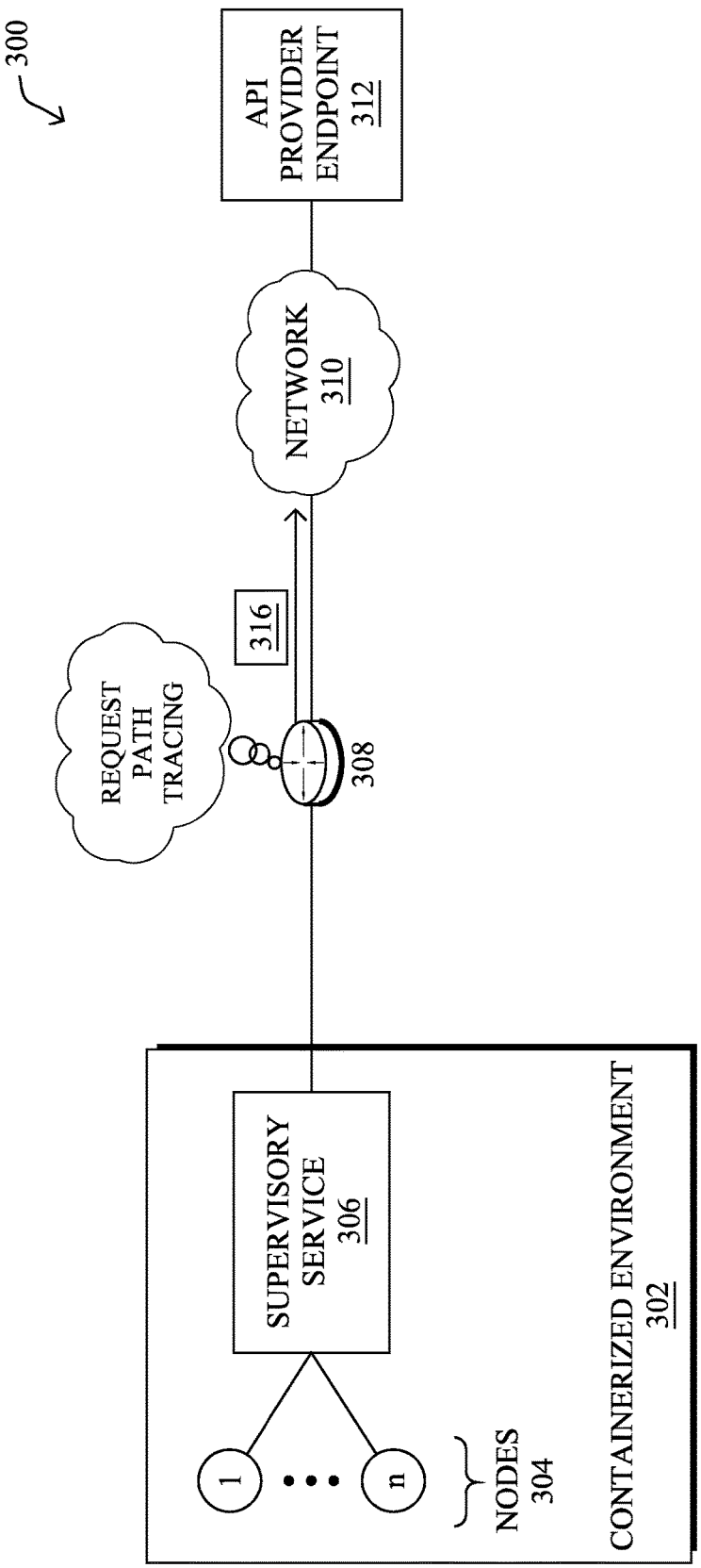

Operationally, FIGS. 4A-4C illustrate an example of initiating API tracing in the architecture of FIG. 3, according to various embodiments. As shown in FIG. 4A and continuing the example of FIG. 3, assume that a particular node 304 in containerized environment 302 makes an external API call to API provider endpoint 312. Accordingly, node 304 may generate and send a corresponding network traffic flow towards API provider endpoint 312 via a path through external network 310.

To trace the path taken by the resulting traffic flow, one naïve solution would be to leverage traceroute, which is a common command in many operating systems to trace the network path taken to a target address. However, this solution is largely insufficient to enforce security policies, as traceroute requires all of the networking devices along the path to have Internet Control Message Protocol (ICMP) replies enabled. This is often not the case, though, as disabling ICMP replies is a recommended security best practice. As such, traceroute results often have large gaps in terms of their visibility into the path taken.

In various embodiments, as shown in FIG. 4B, the techniques herein propose that supervisory service 306 capture the traffic flow information for a given API call made by any of nodes 304. In turn, supervisory service 306 may report the captured flow information 314 to the nearest network visibility agent, such as an agent executed by networking device 308. In various embodiments, captured flow information 314 may include any or all of the 5-tuple information for the traffic flow such as its source address and port (e.g., the address and port of the sending node 304), its destination address and port (e.g., the address and port of external API provider endpoint 312), and the protocol that it uses. Since supervisory service 306 has visibility into both the Layer 7 information, as well as the Layers 3-4 information for the flow, it may maintain a mapping that relates the specific API being called to the traffic flow, as well.

As would be appreciated, network visibility agents are increasingly being deployed at various locations throughout the world on networking devices (e.g., routers, switches, etc.), to provide greater visibility into how traffic is conveyed. For instance, networking device 308 may execute a ThousandEyes agent that is part of a distributed set of agents located throughout external network 310. Of course, other distributed visibility agents could also be leveraged, in other embodiments.

As shown in FIG. 4C, the agent of networking device 308 may then use the captured flow information 314 from supervisory service 306 to request path tracing by the various other visibility agents distributed throughout external network 310. Such a request 316 sent by networking device 308 may include, for instance, at least some of captured flow information 314. In addition, networking device 308 may request path tracing on a periodic basis or on-demand, such as for specific APIs. In one embodiment, the decisions as to when and how to perform path tracing may be configurable via one or more parameters that may be set by an administrator. For instance, an administrator may opt to only perform path tracing for certain APIs infrequently, to reduce the additional overhead that it would entail.

Figure 5:
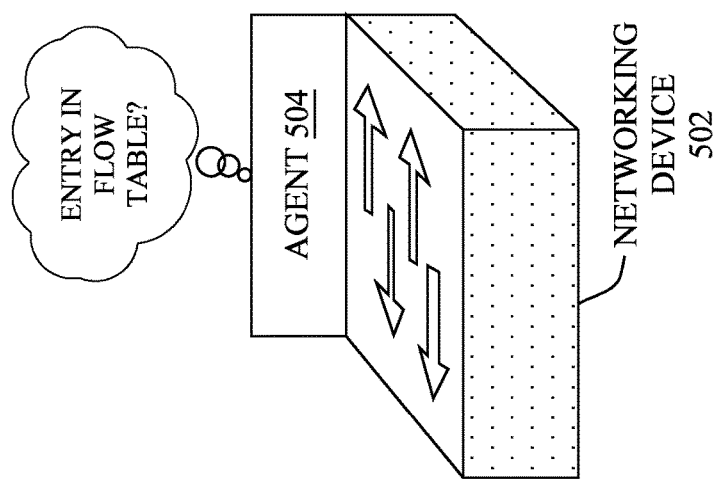
FIG. 5 illustrates an example of an agent on a networking device performing a trace verification.

FIG. 5 illustrates an example of an agent on a networking device performing a trace verification, according to various embodiments. As shown, assume that networking device 502 is located in network 310 shown previously in FIGS. 4A-4C and executes a corresponding visibility agent 504, in various embodiments. There may be any number of such networking devices and agents along the path traversed by the traffic flow associated with the API call.

Assume now that agent 504 on networking device 502 has received a path tracing request from another agent, such as request 316 sent by networking device 308 in FIG. 4C. In response, agent 504 may attempt to verify that the indicated traffic flow exists within the IP flow table of networking device 502, in various embodiments. Specifically, given the 5-tuple information for the traffic flow associated with the API call, agent 504 can query networking device 502 to see whether that specific flow is present in its flow table. In this manner, direct observations from the data plane can serve to corroborate the trace predictions made in the control plane and thus verify the accuracy of the API trace.

Figure 6:
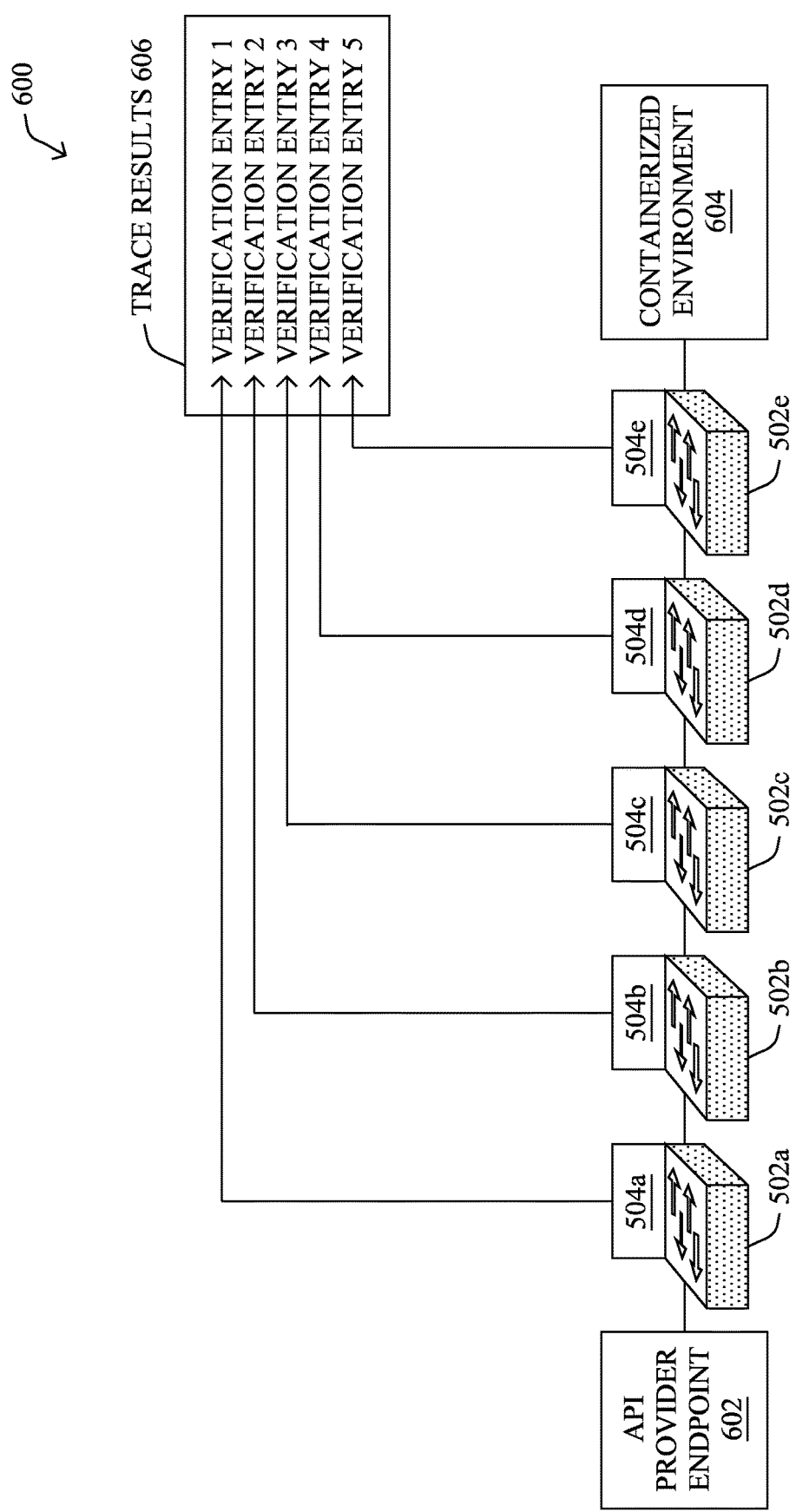
FIG. 6 illustrates an example of the formation of tracing results for an API call.

According to various embodiments, FIG. 6 illustrates an example of the formation of tracing results for an API call. Continuing the previous examples, assume now that there exists a set of networking devices 502a-502e that exist between an API provider endpoint 602 (e.g., API provider endpoint 312) and a containerized environment 604 (e.g., containerized environment 302). In addition, assume that each of networking devices 502a-502e executes a visibility agent, such as agents 504a-504e, respectively. In such a case, in various embodiments, each of agents 504a-504e may perform the verification functions detailed in FIG. 5, to verify that the indicated traffic flow associated with the API call is indeed present in the flow table of its executing networking device 502.

Once verified and starting with the agent closest to API provider endpoint 602, an agent 504 may digitally sign a verification entry in a record that serves as the trace results 606, confirming or denying the presence of the indicated traffic flow in the flow table of its networking device 502. For instance, such a record may take the form of a JSON web token (JWT) that is passed along the path from agent 504 to agent 504 back towards containerized environment 604, each agent 504 adding and signing its own verification entry into the record. Thus, trace results 606 may take the form of a hop-by-hop record of the trace verifications that can be passed back to the supervisory service of containerized environment 604 (e.g., supervisory service 306).

In turn, the supervisory service of containerized environment 604 may enforce its security policy with respect to the traced path, based on the reported trace results 606, in various embodiments. For instance, in some cases, the API call may be blocked entirely or an alert sent for review by an administrator of the application, such as when the path has been found to traverse a prohibited or restricted location. In some instances, the particular API being called may also have a risk score assigned to it by the supervisory service, based on trace results 606 that can be presented to the administrator or used for other purposes. Indeed, even when a particular location is not outright banned from being traversed, certain locations may be deemed more trustworthy than others.

Optionally, and in some embodiments, any or all of agents 504a-504e may also be configured to send their own API call to API provider endpoint 602 from their respective locations. This can be done either periodically or on demand, to obtain performance metrics and other service level information from their different perspectives in the network. While such performance information is not strictly reflective of a security concern, they can still reflect the risk of choosing a given API and could also be used to compute the risk score for that API.

Figure 7:
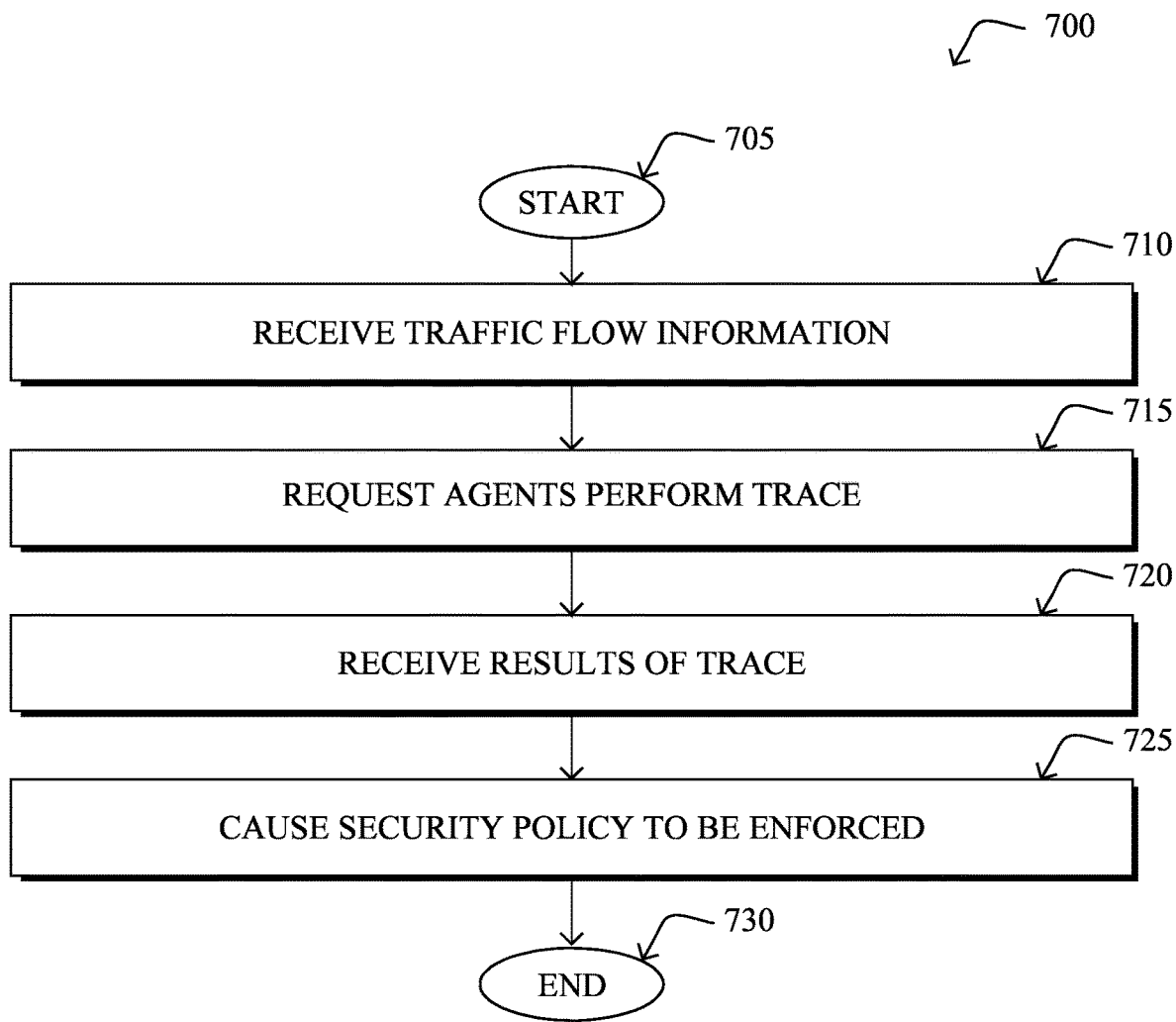
FIG. 7 illustrates an example simplified procedure for performing network API tracing, in accordance with one or more embodiments described herein.

FIG. 7 illustrates an example simplified procedure for performing network API tracing, in accordance with one or more embodiments described herein. For example, a nongeneric, specifically configured device (e.g., device 200, such as a router or other device in a network) may perform procedure 600 by executing stored instructions (e.g., process 248). The procedure 700 may start at step 705, and continues to step 710, where, as described in greater detail above, the device may receive traffic flow information regarding an application programming interface (API) call made to a particular endpoint via a path in a network. In some embodiments, the traffic flow information comprises an address and port of the particular endpoint. In further embodiments, the API call is made to the particular endpoint by a containerized application. In one embodiment, the device receives the traffic flow information from a supervisory service for an environment in which the containerized application is executed. In various embodiments, the device is a networking device, such as a router or switch.

At step 715, as detailed above, the device may request, based on the traffic flow information, that a plurality of distributed agents in the network perform a trace of the path taken by the application programming interface call. In various embodiments, at least one of the plurality of distributed agents performs the trace in part by: verifying that the traffic flow information appears in a flow table of its executing networking device. In some embodiments, at least one of the plurality of distributed agents perform the trace in part by making an API call to the particular endpoint.

At step 720, the device may receive results from the trace of the path performed by the plurality of distributed agents, as described in greater detail above. In one embodiment, the results from the trace indicate that the path traverses a geolocation that is prohibited by the security policy. In various embodiments, the results are signed by at least a portion of the plurality of distributed agents attesting to the traffic flow information appearing in flow tables of their executing networking devices along the path.

At step 725, as detailed above, the device may cause a security policy to be enforced with respect to application programming interface calls made to the particular endpoint, based on the results from the trace. In some embodiments, the security policy is enforced in part by using the results of the trace to assign a risk score to the API call.

The procedure 700 may then end in step 730, notably with the ability to continue ingesting and processing data. Other steps may also be included generally within procedure 700.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a tenant," "by a server," or "by a controller," those skilled in the art will appreciate that agents of the application intelligence platform (e.g., application agents, network agents, language agents, etc.) may be considered to be extensions of the server (or controller) operation, and as such, any process step performed "by a server" need not be limited to local processing on a specific server device, unless otherwise specifically noted as such. Furthermore, while certain aspects are described as being performed "by an agent", by particular types of agents (e.g., application agents, network agents, etc.), or "by a tenant", the techniques may be generally applied to any suitable software/hardware configuration (libraries, modules, etc.) as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
receiving, at a device, traffic flow information regarding an application programming interface call made to a particular endpoint via a path in a network;
requesting, by the device and based on the traffic flow information, that a plurality of distributed agents in the network perform a trace of the path taken by the application programming interface call;
receiving, at the device, results from the trace of the path performed by the plurality of distributed agents;
determining, by the device, that the results from the trace indicate that the path traverse a geolocation that is prohibited, restricted, or untrustworthy according to a security policy; and
enforcing, by the device, the security policy with respect to the application programming interface calls made to the particular endpoint, based on the results from the trace indicating that the path traverses a geolocation that is prohibited, restricted, or untrustworthy according to the security policy; and
wherein enforcing the security policy with respect to the application programming interface calls made to the particular endpoint comprises: causing a supervisory service to execute a containerized application on an environment to enforce the security policy.

2. The method as in claim 1, wherein the traffic flow information comprises an address and port of the particular endpoint.

3. The method as in claim 1, wherein the application programming interface call is made to the particular endpoint by a containerized application.

4. The method as in claim 3, wherein the device receives the traffic flow information from a supervisory service for an environment in which the containerized application is executed.

5. The method as in claim 1, wherein the security policy is enforced in part by using the results of the trace to assign a risk score to the application programming interface call.

6. The method as in claim 1, wherein at least one of the plurality of distributed agents performs the trace in part by:
verifying that the traffic flow information appears in a flow table of its executing networking device.

7. The method as in claim 6, wherein the results are signed by at least a portion of the plurality of distributed agents attesting to the traffic flow information appearing in flow tables of their executing networking devices along the path.

8. The method as in claim 1, wherein at least one of the plurality of distributed agents performs the trace in part by:
making an application programming interface call to the particular endpoint.

9. The method as in claim 1, wherein the device is a router.

10. An apparatus, comprising:
one or more network interfaces to communicate with a network;
a processor coupled to the one or more network interfaces and configured to execute one or more processes; and
a memory configured to store a process that is executable by the processor, the process, when executed, configured to:
receive traffic flow information regarding an application programming interface call made to a particular endpoint via a path in a network;
request, based on the traffic flow information, that a plurality of distributed agents in the network perform a trace of the path taken by the application programming interface call;
receive results from the trace of the path performed by the plurality of distributed agents;
enforcing the security policy with respect to the application programming interface calls made to the particular endpoint, based on the results from the trace indicating that the path traverses a geolocation that is prohibited, restricted, or untrustworthy according to the security policy; and
wherein enforcing the security policy with respect to the application programming interface calls made to the particular endpoint comprises: causing a supervisory service to execute a containerized application on an environment to enforce the security policy.

11. The apparatus as in claim 10, wherein the traffic flow information comprises an address and port of the particular endpoint.

12. The apparatus as in claim 10, wherein the application programming interface call is made to the particular endpoint by a containerized application.

13. The apparatus as in claim 12, wherein the apparatus receives the traffic flow information from a supervisory service for an environment in which the containerized application is executed.

14. The apparatus as in claim 10, wherein the security policy is enforced in part by using the results of the trace to assign a risk score to the application programming interface call.

15. The apparatus as in claim 10, wherein at least one of the plurality of distributed agents performs the trace in part by:
verifying that the traffic flow information appears in a flow table of its executing networking device.

16. The apparatus as in claim 15, wherein the results are signed by at least a portion of the plurality of distributed agents attesting to the traffic flow information appearing in flow tables of their executing networking devices along the path.

17. The apparatus as in claim 10, wherein at least one of the plurality of distributed agents performs the trace in part by:
making an application programming interface call to the particular endpoint.

18. A tangible, non-transitory, computer-readable medium storing program instructions that cause a device to execute a process comprising:
receiving, at the device, traffic flow information regarding an application programming interface call made to a particular endpoint via a path in a network;
requesting, by the device and based on the traffic flow information, that a plurality of distributed agents in the network perform a trace of the path taken by the application programming interface call;
receiving, at the device, results from the trace of the path performed by the plurality of distributed agents; and
enforcing, by the device, the security policy with respect to the application programming interface calls made to the particular endpoint, based on the results from the trace indicating that the path traverses a geolocation that is prohibited, restricted, or untrustworthy according to the security policy; and
wherein enforcing the security policy with respect to the application programming interface calls made to the particular endpoint comprises: causing a supervisory service to execute a containerized application on an environment to enforce the security policy.

* * * * *